United States Patent
Ketolainen et al.

[11] Patent Number: 5,897,788
[45] Date of Patent: Apr. 27, 1999

[54] METHOD AND APPARATUS FOR CLEANING A FILTER DRUM USED FOR THICKENING LIME MUD

[75] Inventors: Vesa Ketolainen; Pekka Ruokolainen, both of Savonlinna; Juba Titoff, Kerimäki, all of Finland

[73] Assignee: Ahlstrom Machinery Oy, Helsinki, Finland

[21] Appl. No.: 08/525,783

[22] PCT Filed: Apr. 7, 1994

[86] PCT No.: PCT/FI94/00134

§ 371 Date: Nov. 16, 1995

§ 102(e) Date: Nov. 16, 1995

[87] PCT Pub. No.: WO94/23821

PCT Pub. Date: Oct. 27, 1994

[30] Foreign Application Priority Data

Apr. 8, 1993 [FI] Finland ..................................... 931636

[51] Int. Cl.$^6$ ......................... B01D 33/073; B01D 33/46; B01D 33/50

[52] U.S. Cl. ......................... 210/784; 210/777; 210/791; 210/797; 210/391; 210/396; 210/402; 210/406; 210/408; 210/409

[58] Field of Search ..................... 210/193, 217, 210/391, 412, 396, 402, 403, 404, 406, 408, 409, 784, 777, 791, 797, 407

[56] References Cited

U.S. PATENT DOCUMENTS

| | | |
|---|---|---|
| 2,839,194 | 6/1958 | Loplzer et al. . |
| 3,152,986 | 10/1964 | Bice et al. ................................. 210/404 |
| 3,169,706 | 2/1965 | Ross . |
| 3,521,751 | 7/1970 | Holthuis . |
| 5,149,448 | 9/1992 | Mattelmaki . |
| 5,423,977 | 6/1995 | Aoki et al. . |
| 5,470,472 | 11/1995 | Baird et al. ................................. 210/391 |
| 5,759,397 | 6/1998 | Larsson et al. ......................... 210/331 |

FOREIGN PATENT DOCUMENTS

| | | |
|---|---|---|
| 0454392A1 | 10/1991 | European Pat. Off. . |
| WO 93/23140 | 11/1993 | WIPO . |

*Primary Examiner*—Robert J. Popovics
*Attorney, Agent, or Firm*—Nixon & Vanderhye P.C.

[57] ABSTRACT

A method and apparatus to clean a filter drum used for thickening lime mud. The drum is rotated about a horizontal axis in a first direction so that the circumferential surface of the drum moves into contact with lime mud in a vat and a precoat layer formed on the drum, as well as an external layer of lime mud which forms a thickened lime mud cake when a vacuum is applied to the drum withdrawing liquid from the lime mud. The thickened external layer of lime mud cake is scraped from the drum at a second side of the vat, and at a first opposite side of the vat a first jet of liquid is directed onto the drum surface (e.g. at a pressure of about 30–100 bar) to remove a strip of the precoat layer, a third jet of liquid cleans the drum after removal of the precoat layer, and a second jet of liquid is directed onto the drum with sufficient intensity (e.g. a pressure of about 2–20 bar) to remove, by spreading and partially detaching, a strip from the thickened lime mud cake. Typically the second jet is operated substantially continuously, except when the first and third jets are operated, the first and third jets being operated at spaced time intervals (e.g. periodically or intermittently). The invention results in partial removal of the precoat with a gentle liquid jet, easy removal of the entire precoat layer because the precoat is not yet hardened at its location of movement, intermittent use of high pressure jets which extends the life of the high pressure apparatus in the wire forming the drum, and optimum ease of installation and maintenance of the spray nozzles.

20 Claims, 2 Drawing Sheets

METHOD AND APPARATUS FOR CLEANING A FILTER DRUM USED FOR THICKENING LIME MUD

FIELD OF THE INVENTION

The present invention relates to a method and an apparatus for cleaning a filter drum, or a filter cylinder, used for thickening lime mud by means of which lime mud is thickened on a filtering layer deposited on the surface of the filter drum partially immersed in a vat containing lime mud.

BACKGROUND ART

Prior to the lime mud reburning kiln, the lime mud having a dry solids content of approx. 25% is thickened normally to a dry solids content of 70–85% in a drum vacuum filter. At the beginning of the filtering process a so-called precoat layer is formed of the lime mud on the surface of the filtering drum; the thickness of the precoat is normally 10–20 mm. A scraper is used to remove the dried lime mud thickened onto the surface of the precoat layer. The dried lime mud falls onto a conveyor and further to a feed screw of the lime mud reburning kiln supplying the dried mud to the kiln.

The surface layer of the precoat becomes clogged while the filtering proceeds and from time to time it must be removed. The technique normally used is to move the automatic scraper gradually inwards following a predetermined program, thus removing the clogged surface layer. After the scraper has moved in several steps closer to the drum the rest of the precoat is removed by-means of air or water, and a new precoat is formed.

All the movements of the scraper described above and the removal of the whole precoat from the surface of the drum cause disturbances in the operation of the lime mud reburning kiln. Every time the clogged surface layer of the precoat has been removed by means of the scraper the filtering is more efficient and the lime mud volume is larger for a moment. Further, also the dry solids content of the lime mud is higher after the precoat has been scraped which results in and calls for changes the running of the lime mud reburning kiln. When the whole precoat is renewed at the same time the lime mud is damp and the supply of the mud into the kiln is stopped altogether for a moment which naturally causes a break in the operation of the kiln. Typically, the precoat is renewed once a shift, or correspondingly three times in 24 hours. In the long run, also the wire is so badly clogged that it must be washed either with acid or with a high-pressure washer. This operation also causes a long disturbance or interrupts the production of the lime mud reburning kiln.

The arrangement disclosed in U.S. Pat. No. 5,149,448 reduces the disadvantages and problems of the known techniques described above by removing a strip at a time from the filtering layer by means of a liquid jet reciprocating continuously in the longitudinal direction of the drum. This has been effected by installing under the scraper one nozzle or several nozzles continuously reciprocating in the longitudinal direction of the drum. The high-pressure nozzles, for example two in number, have been provided under the scraper so that the purpose of one of the nozzles is to break the precoat layer and to drop it to the filter vat after which the second nozzle is used to wash the filter cloth clean. The pressure of the water sprayed from the washing nozzles is approx. 5–100 bar which gives a very good cleaning result. The nozzle disperses the jets so that the precoat is removed and the wire washed from a strip of approx. 10–50 in width at a time.

According to the arrangement of the above US patent, the washing nozzles have been installed in a rack designed for this purpose for moving the nozzles sideways. The nozzles are moved continuously to and fro in the longitudinal direction of the drum thus continuously renewing the precoat and cleaning the filter cloth. The advantages provided by this kind of continuous high-pressure water scraping are:

the dry-solids content of the lime mud from the lime mud filter to the lime mud reburning kiln is continuously uniform which allows smooth running of the kiln;

change of the precoat is not needed as the precoat is renewed continuously a strip at a time; thus disturbances in the operation of the kiln due to a change of the precoat are avoided;

it is not necessary to interrupt the filtering operation for a wash of the wire.

In the arrangement of said US patent the nozzle/nozzles are located under the scraper removing dried lime mud from the drum; thus the location is as inconvenient as possible in view of the installation and maintenance of the nozzles. Also, lime mud splashes from nozzles located under the scraper may impede the operation of the scraper. Further, because of the operation way of the nozzles and their direction determined by the operation way, the splashes caused by the removal of the precoat impinge on the nozzles and dry as deposits on the structures preventing the movement of the nozzle rack. Further, the precoat is hardest under the scraper because it has been longest under the influence of the pressing partial vacuum.

SUMMARY OF THE INVENTION

In order to avoid the drawbacks described above, the method and the apparatus according to the present invention for cleaning a filter drum used for thickening lime mud has been developed the characteristic features of which are disclosed in the appended patent claims.

The method and the apparatus of the invention provide the following advantages over the prior art technology:

partial removal of the precoat with a gentle liquid jet;

easier removal of the whole precoat layer because the precoat is not hard;

intermittent use of the high-pressure jets
saves the high-pressure apparatus;
saves the wire;

the location of the washing apparatus is optimal in view of installation and maintanence;

the direction of the washing nozzles is optimal in view of their operation and staying clean.

BRIEF DESCRIPTION OF THE DRAWINGS

The method and the apparatus of the invention will be described more in detail below, by way of example, with reference to the accompanying drawings of which.

DETAILED DESCRIPTION OF THE DRAWINGS

Figure 1:
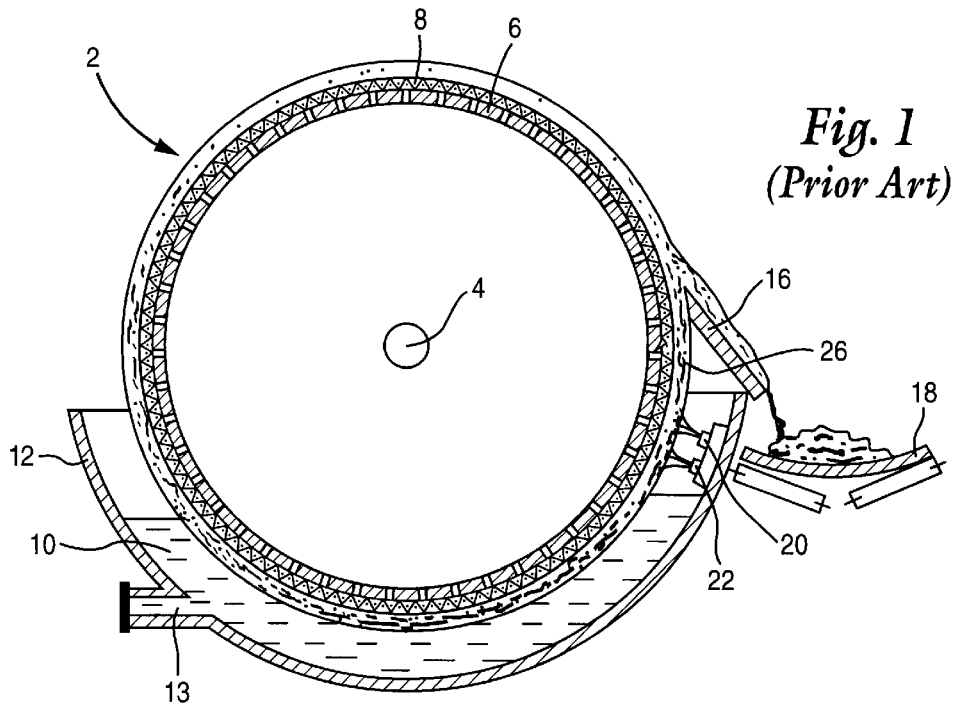
FIG. 1 illustrates schematically a cross section of a prior art lime mud filter of U.S. Pat. No. 5,149,448.

FIGS. 1–4 illustrate a suction drum filter consisting of a rotating drum 2 mounted on a shaft 4. The shell of the drum is made of a plate 6 perforated in a conventional way. The shell is covered with a filter cloth 8, i.e. a wire. Inside the perforated plate, the drum is usually devided into filtrate compartments, each having a filtrate duct leading either to a filtrate discharge valve at the end of the drum or to the shaft which, of course, in this case must be hollow for discharging the filtrate therethrough from the apparatus. The drum is partly immersed in a vat 12 containing lime mud 10, the vat having an inlet 13 for introducing to the vat lime mud at a dry-solids content of 20–25% for filtration. The drum is connected to a suction device (not illustrated) by a method known per se either via the filtrate discharge valve or directly via an end 14 of the hollow shaft.

A scraper 16 extending from one end of the drum 2 to the other is provided at a side of the drum to remove dried lime mud from the surface of the drum, i.e. from the surface of the wire 8, and to guide the detached dried lime mud onto a belt conveyor 18 beside the drum or a corresponding means which transports it to the lime mud reburning kiln.

In the prior art apparatus illustrated in FIG. 1, there are two high-pressure washing nozzles, 20 and 22, one on top of the other under the scraper 16, the nozzles being movably mounted in a rod extending in the longitudinal direction of the drum, and connected in a manner know per se to a drive means (not illustrated) for reciprocating the nozzles continuously in the longitudinal direction of the drum from one end of the drum to the other.

The apparatus operates as follows: when the drum rotates lime mud is attached to and forms a layer on the filter cloth in the part of the drum immersed in the vat. The partial vacuum prevailing in the drum provides a pressure difference drawing liquid from the lime mud through the filter cloth. While during rotation of the drum the lime mud layer rises up from the vat the partial vacuum continues to remove liquid from the lime mud layer and further raises the dry-solids content of the lime mud. The liquid, i.e. week liquor, separated from the lime mud is removed from the apparatus via the hollow shaft of the drum or via filtrate ducts provided otherwise. Thickening of the lime mud is effected by means of a precoat layer 26 formed on the surface of the filter drum, i.e. wire; thus the thickening takes place both through the filtering lime mud layer formed onto the filter cloth and through the filter cloth. The scraper 16 cuts lime mud thickened to a dry-solids content of approx. 70–85% from the surface of the precoat and the mud drops onto a belt conveyor 18 or a corresponding means. The tip of the scraper is kept at a constant distance from the surface of the drum, thus the thickness of the precoat remains within the range of approx. 10–15 mm. The movable nozzles 20 and 22 under the scraper remove during each revolution of the drum a part of the precoat layer so that a narrow strip of the precoat is removed altogether. The jet sprayed from the upper nozzle breaks the precoat where the jet impinges the precoat and drops it to the filter vat 12 and the lower nozzle 22 washes the filter cloth clean. The pressure in the nozzles is high enough, e.g. 100 bar, to give a good cleaning effect. The nozzles disperse the water jet so that the precoat is removed and the wire washed from an area of approx. 5–50 mm in width at a time. The rotation speed of the drum is 0–8 r/min. The nozzle moves either so that is stays in place during one revolution of the drum and moves onwards a distance corresponding to one cleaning width of the nozzle at a time and cleans the next strip of the drum surface, or so that during one revolution of the drum, the nozzle slowly and continuously moves a distance corresponding to the width of the jet.

Figure 2:
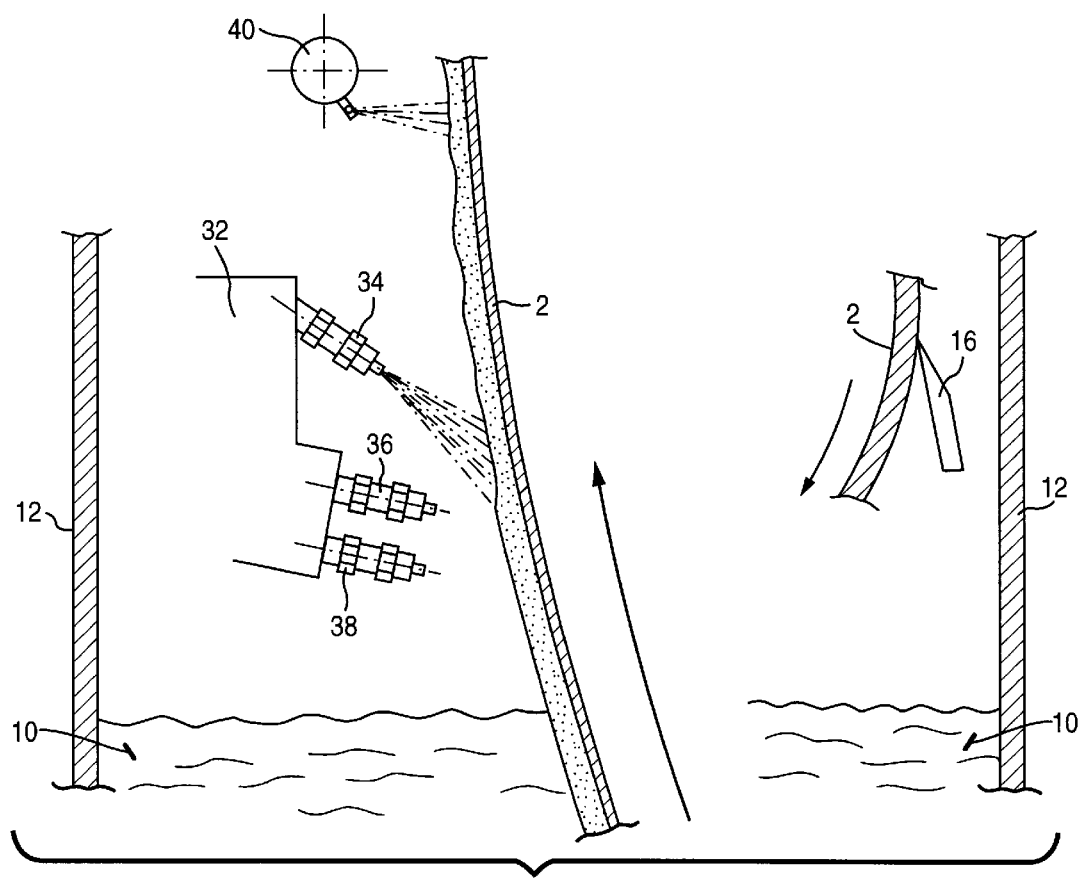
FIG. 2 illustrates schematically a cross section of a preferred embodiment of a lime mud filter according to the present invention; in particular, one operation stage of the filter is illustrated.

FIG. 2 illustrates an embodiment of a lime mud filter according to the invention in an operation stage, comprising nozzles 34, 36 and 38 mounted in a nozzle body 32 and placed relative to the scraper on the opposite side of the drum 2 above the lime mud surface 10 in the vat 12. The embodiment in the Figure illustrates three nozzles, 34, 36 and 38, placed so that nozzle 34 is directed at a wider angle against the lime mud layer rising from the vat on the drum than nozzles 36 and 38.

FIG. 2 illustrates particularly the operation of the nozzle 34. The function of the nozzle 34 is to remove by spreading and partly also detaching by means of a gentle jet, having a pressure of approx. 2–20 bar, the lime mud cake deposited on the precoat layer, as well as to detach a small part of the precoat layer itself throughout the width of the jet which preferably is approx. 50–100 mm. The form of the jet is preferably linear or round, sometimes it may be even elliptic. The acute angle of the nozzle 34 against the lime mud layer rising from the vat provides a jet which efficiently detaches a part of the lime mud layer but does not "pack" tighter or clogg the precoat layer remaining on the drum.

An advantage provided by carrying out the cleaning by means of a nozzle located in this way is that the lime mud layer on the drum is at this filtering stage still quite porous and easily detachable because its dry-solids content has not increased very high, yet, contrary to prior art arrangements.

Figure 3:
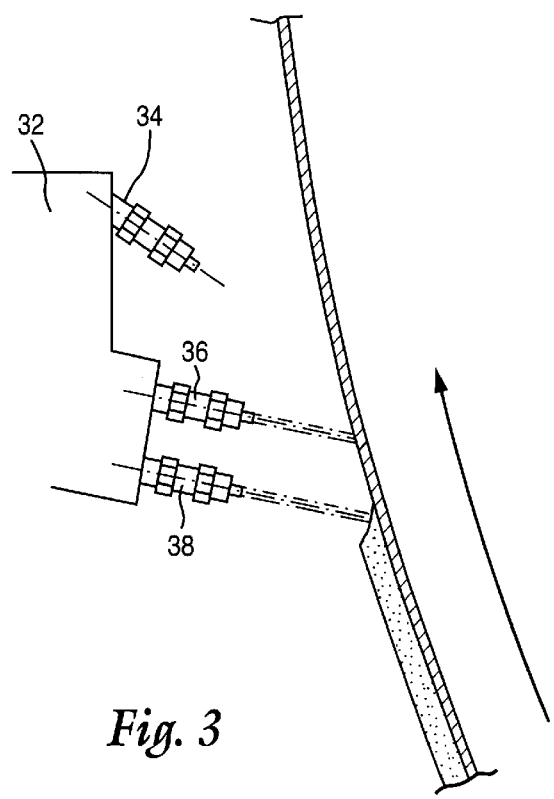
FIG. 3 illustrates schematically a cross section of a preferred embodiment of a lime mud filter according to the present invention; in particular, another operation stage of the filter is illustrated.

FIG. 3 illustrates the operation and the function of the nozzles 36 and 38. The jet of the nozzle 38 is used to detach a strip as wide as the liquid jet of the precoat layer, throughout its thickness, from the wire surface 8. The precoat layer detached by the jet drops down to the vat and, subsequently, the wire surface 8 may be efficiently washed with the jet of the nozzle 36 along the strip exposed by the jet of the nozzle 38. The liquid pressure of both the nozzles is preferably kept in the range 30–70 bar, sometimes even up to 100 bar if necessary, and the form of the jets is preferably spot-like while the width of the "cut", i.e. the strip to be cleaned preferably is approx. 10–15 mm, sometimes even 30 mm. The low-pressure nozzle is closed during the wash of the wire. The low-pressure nozzle may also be kept open whereby the low-pressure liquid spreads the lime mud cake and the precoat layer from the edges of the cleaned area to the cleaned exposed area. Thus, the pressure difference over the filter surface which is essential in the filtering process is not lost. When the method of the present invention is applied it is not necessary to use the high-pressure nozzles continuously but only when it is desirable to renew the whole precoat layer and to wash the wire surface. Thus, the high-pressure jet does not strain the wire cloth continuously which remarkably prolongs the life of the wire. Also, the life of all the high-pressure circuit apparatus is prolonged as they are used only for a part of the time the drum is used. Further, because the washing apparatus is located in a cleaner place than conventionally, and particularly since it has been directed so that the washing splashes fall down to the vat instead of spraying upward the nozzles stay clean longer and the operational reliability of the drum is improved.

A further advantage provided by the location of the nozzles according to the present invention is that the jets of the nozzles 40 (illustrated in FIG. 2) used for washing the cake wash also the strip area exposed by the nozzle 34, i.e. the surface of the precoat layer, making it more porous and cleaner for new deposition of lime mud cake.

Figure 4:
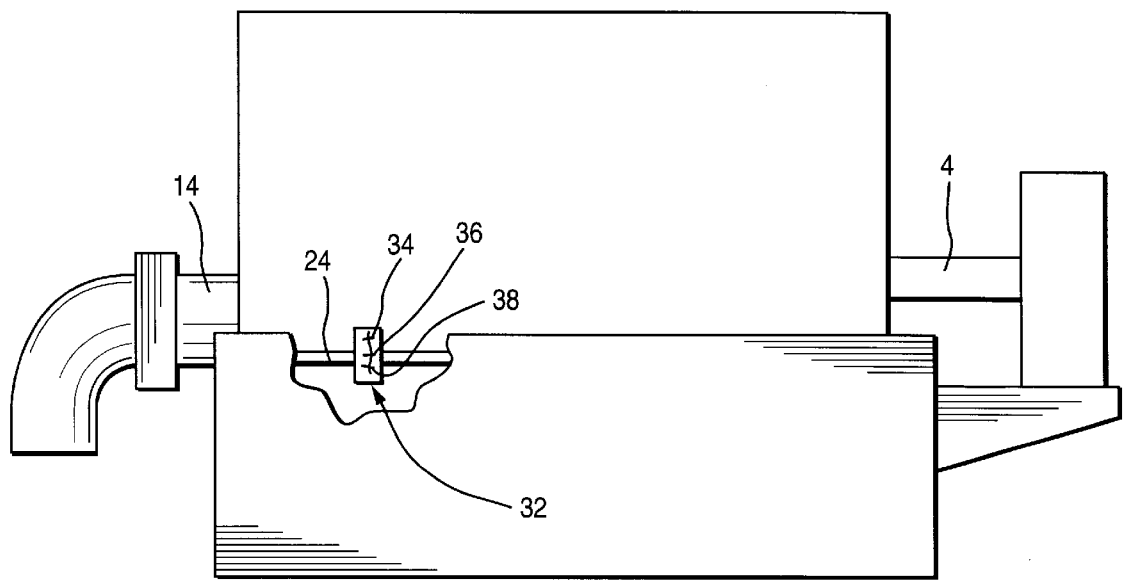
FIG. 4 illustrates schematically a side view of a lime mud filter according to the invention.

FIG. 4 illustrates how the nozzle body 32 with the nozzles 34, 36 and 38 have been mounted on a rail 24 extending along the whole length of the drum. The nozzle body is moved, as already described, either in stages so that the body stays immovable during one revolution of the drum after which it is moved on a distance equal to that of the width of the jet, or so that the nozzle body moves very slowly onwards while the drum rotates in such a way that the distance the nozzle body moves during one revolution of the drum corresponds to the width of the jet. It should also be noted that in good conditions the movement of the nozzle body may be faster whereby the jet in a way opens a screw-like line in the surface of the lime mud layer. In this case the pitch of the thread thus produced is wider then the width of the jet.

Usually, the nozzle body is quickly returned to its initial position and a new spraying stage is started. During the return movement the nozzle is usually closed but it may be open all the time. Further, it is possible that the movement speed of the nozzle body in both directions is equal. This is applicable at least when the nozzle body is moved at a relatively high speed to form a "screw line".

While the invention has been herein shown and described in what is presently conceived to be the most practical and preferred embodiment, it is to be understood that the invention is not to be limited to the disclosed embodiments, but on the contrary, is intended to cover various modifications and equivalent arrangements included within the spirit and scope of the appended claims.

We claim:

1. A method of cleaning a filter drum for thickening lime mud, the drum having a circumferential surface, and using a mechanical scraper and a vat containing lime mud establishing a level of lime mud therein, said method comprising the steps of:

(a) rotating the drum filter about an axis in a first direction with respect to the vat so that the circumferential surface thereof has a precoat layer formed thereon, and an external layer of lime mud on the precoat layer, the circumferential surface of the drum filter exiting the vat at a first side thereof;

(b) applying a vacuum to the circumferential surface of the drum to withdraw liquid from the lime mud thereon, and thicken the external layer as the drum rotates about its axis to form a lime mud cake;

(c) mechanically scraping the thickened external layer of lime mud cake from the drum at a second side of the vat, opposite the first side, by relative movement of the rotating drum with respect to the scraper;

(d) between the first side of the vat, above the level of lime mud therein, and the scraper directing a first jet of liquid onto the drum surface with sufficient intensity to remove a strip of the precoat layer from the circumferential surface of the drum; and (e) between the first side of the vat, above the level of lime mud therein, and the scraper, directing a second jet of liquid onto the drum surface, while longitudinally moving the second jet with respect to the drum surface, with sufficient intensity to remove, by spreading and partially detaching, a strip from the thickened lime mud cake.

2. A method as recited in claim 1 comprising the further step of, (f) between the first side of the vat, above the level of lime mud therein, and the scraper, directing a third jet of liquid onto the drum surface with sufficient intensity to wash the circumferential surface thereof from which the precoat layer has been removed by the practice of step (d).

3. A method as recited in claim 2 wherein steps (d) and (f) are each practiced using a jet of liquid at a pressure of between about 30–100 bar.

4. A method as recited in claim 2 wherein step (d) is practiced so that a strip approximately 10–20 mm in width of the precoat layer is detached, and wherein step (f) is practiced to clean the drum surface from which the strip of precoat has been detached.

5. A method as recited in claim 2 wherein step (e) is practiced substantially continuously, and steps (d) and (f) are practiced only a spaced time intervals.

6. A method as recited in claim 1 wherein step (e) is practiced substantially continuously, and step (d) practiced only at spaced time intervals.

7. A method as recited in claim 1 wherein step (d) practiced only at spaced time intervals, and wherein step (e) is practiced substantially continuously except when step (d) is being practiced.

8. A method as recited in claim 1 wherein step (d) is practiced using a jet of liquid at a pressure of between about 30–100 bar.

9. A method as recited in claim 8 wherein step (e) is practiced with a liquid jet at a pressure between about 2–20 bar.

10. A method as recited in claim 1 wherein step (d) is practiced with a liquid jet at a pressure between about 2–20 bar.

11. A method as recited in claim 1 wherein steps (d) and (e) are practiced adjacent the first side of the vat, so that lime mud and thickened lime mud cake and the precoat layer detached from the drum surface fall into the vat.

12. A method as recited in claim 1 wherein step (e) is practiced to remove a strip of thickened lime mud cake about 50–100 mm in width.

13. A method as recited in claim 1 wherein step (d) is also practiced to wash the circumferential surface of the drum from which the precoat layer has been removed.

14. A method as recited in claim 1 wherein step (e) is practiced utilizing a second jet nozzle, and by moving the second nozzle longitudinally with respect to the drum surface in stages, so that the length of each stage is equal to at least the width of the strip of thickened lime mud removed from the drum.

15. A method as recited in claim 1 wherein step (e) is practiced utilizing a second liquid jet nozzle, and by continuously moving the second jet nozzle with respect to the drum surface along the axial direction of the drum so that during each revolution of the drum the second jet nozzle is moved a distance in axial direction at least equal to the width of the second jet of liquid.

16. A method as recited in claim 15 wherein step (d) is practiced using a first jet nozzle, and by reciprocating the first jet nozzle along with the second jet nozzle.

17. A method as recited in claim 16 wherein step (d) practiced only at spaced time intervals, and wherein step (e) is practiced substantially continuously except when step (d) is being practiced.

18. Apparatus for forming thickened lime mud cake, comprising:

a vat having a level of lime mud therein, and a first side and a second side substantially opposite said first side;

a drum rotatable about a substantially horizontal axis, and having a circumferential surface, said axis positioned with respect to said vat so that a portion of said circumferential surface is immersed in the lime mud in said vat, and during rotation moves out of the vat, with a precoat layer thereon and an external layer of lime mud;

means for applying a vacuum to said drum, external of said vat, to thicken said external layer of lime mud;

a mechanical scraper mounted adjacent said second side of said vat for scraping thickened lime mud cake formed from said external layer off of said drum;

a first jet nozzle for removing only a strip of precoat layer from the surface of said drum, mounted between said level of lime mud in said vat at said vat first side, and said scraper and longitudinally reciprocal with respect to said drum; and a second jet nozzle for spreading and partially detaching only a strip of thickened lime mud cake from the drum, mounted between said level of lime mud in said vat at said vat first side, and said scraper and longitudinally reciprocal with respect to said drum.

19. Apparatus as recited in claim 18 wherein said first and second nozzles are mounted adjacent said first side of said vat, and positioned so that lime mud removed thereby falls into said vat.

20. Apparatus as recited in claim 19 further comprising a third jet nozzle for cleaning the exposed surface of said drum after said first jet nozzle has removed the strip of precoat layer therefrom, said third jet nozzle mounted adjacent said first jet nozzle and said first side of said vat.

* * * * *